(12) United States Patent
Zavaliche et al.

(10) Patent No.: US 11,763,845 B2
(45) Date of Patent: Sep. 19, 2023

(54) MAGNETIC STACK INCLUDING NON-MAGNETIC SEED LAYER FOR HARD DISK DRIVE MEDIA

(71) Applicant: Seagate Technology LLC, Freemont, CA (US)

(72) Inventors: Florin Zavaliche, San Ramon, CA (US); Kai Chieh Chang, Pleasanton, CA (US); Pin-Wei Huang, Fremont, CA (US); Ganping Ju, Pleasanton, CA (US); Jan-Ulrich Thiele, Sunnyvale, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/554,341

(22) Filed: Dec. 17, 2021

(65) Prior Publication Data

US 2023/0178106 A1 Jun. 8, 2023

Related U.S. Application Data

(60) Provisional application No. 63/287,398, filed on Dec. 8, 2021.

(51) Int. Cl.
*G11B 5/716* (2006.01)
*G11B 5/65* (2006.01)
*G11B 5/73* (2006.01)

(52) U.S. Cl.
CPC .............. *G11B 5/716* (2013.01); *G11B 5/657* (2021.05); *G11B 5/7369* (2019.05); *G11B 5/7379* (2019.05)

(58) Field of Classification Search
None
See application file for complete search history.

(56) References Cited

U.S. PATENT DOCUMENTS

| | | | |
|---|---|---|---|
| 8,956,741 B1 * | 2/2015 | Li | G11B 5/7379 428/831 |
| 9,406,329 B1 | 8/2016 | Ho et al. | |
| 9,558,777 B2 | 1/2017 | Hellwig et al. | |
| 9,697,859 B1 | 7/2017 | Tripathy et al. | |
| 9,779,771 B1 * | 10/2017 | Wang | G11B 5/72 |
| 10,269,382 B1 | 4/2019 | Zavaliche et al. | |
| 2005/0249981 A1 * | 11/2005 | Cheng | G11B 5/7379 427/128 |
| 2006/0154110 A1 * | 7/2006 | Hohlfeld | G11B 5/855 |
| 2007/0172705 A1 * | 7/2007 | Weller | G11B 5/66 428/827 |
| 2009/0040644 A1 * | 2/2009 | Lu | G11B 5/314 360/59 |
| 2010/0173175 A1 * | 7/2010 | Takahashi | G11B 5/7379 428/800 |
| 2014/0063656 A1 * | 3/2014 | Hashimoto | G11B 5/7379 360/110 |

(Continued)

*Primary Examiner* — Kevin M Bernatz

(57) ABSTRACT

A magnetic stack includes a substrate and a soft magnetic underlayer deposited on a top surface of the substrate. A heat sink layer is disposed on top of the soft magnetic underlayer, and an interlayer is deposited on top of the heat sink layer. A non-magnetic seed layer is deposited on top of the interlayer. A magnetic recording structure which includes more than one magnetic recording layer is deposited on the top surface of the non-magnetic seed layer.

16 Claims, 4 Drawing Sheets

(56) References Cited

U.S. PATENT DOCUMENTS

| | | | |
|---|---|---|---|
| 2014/0093748 A1* | 4/2014 | Chen | C23C 14/0641 |
| | | | 428/832 |
| 2014/0099517 A1* | 4/2014 | Hu | G11B 5/8404 |
| | | | 204/192.1 |
| 2015/0262603 A1* | 9/2015 | Tonooka | G11B 5/7369 |
| | | | 204/192.15 |
| 2016/0099017 A1 | 4/2016 | Hellwig et al. | |
| 2019/0198051 A1* | 6/2019 | Kataoka | G11B 5/656 |
| 2021/0005219 A1* | 1/2021 | Hasegawa | G11B 5/851 |

* cited by examiner

MAGNETIC STACK INCLUDING NON-MAGNETIC SEED LAYER FOR HARD DISK DRIVE MEDIA

This application claims priority to U.S. Provisional Patent Application Ser. No. 63/287,398, entitled "MAGNETIC STACK INCLUDING NON-MAGNETIC SEED LAYER FOR HARD DISK DRIVE MEDIA" and filed Dec. 8, 2021, the entire contents of which are hereby incorporated by reference.

BACKGROUND

Some hard disk drives (HDDs) use heat assisted magnetic recording (HAMR) technology to store information. HDDs using HAMR technology typically utilize a laser to heat a small spot on a magnetic media. Heating the magnetic media reduces the coercivity of the magnetic media, which enables a write head to change the magnetization direction of a bit and thus store information to the magnetic media. The ease of magnetization or demagnetization of the magnetic media depends on material parameters of the magnetic recording layers and underlying layers. Material parameters may include composition, crystal structure and grain orientation. Growing granular magnetic media for HAMR recording on homogenous underlayers is a complex physics problem and may require complex processing conditions to meet structural, morphological, magnetic, and thermal requirements.

SUMMARY

The present disclosure describes a magnetic stack for magnetic media used in a hard disk drive. The magnetic stack includes a magnetic recording structure configured to store data that is disposed on top of a relatively thin (e.g., compared to the magnetic layer) non-magnetic nucleation layer, also referred to as a seed layer. In some examples, the non-magnetic seed layer is less than or equal to approximately 5 Å. The non-magnetic seed layer may promote epitaxial growth of the subsequently deposited magnetic recording layers and control the wetting conditions.

In one example, a recording medium stack is described. The recording medium stack may comprise a substrate, a soft magnetic underlayer disposed on a top surface of the substrate, a heat sink layer disposed on top of the soft magnetic underlayer, and an interlayer disposed on a top surface of the heat sink layer. A non-magnetic seed layer may be disposed on a top surface of the interlayer, and a magnetic recording structure disposed on a top surface of the non-magnetic seed layer. The magnetic recording structure may comprise a plurality of magnetic recording layers.

DETAILED DESCRIPTION

Figure 1:
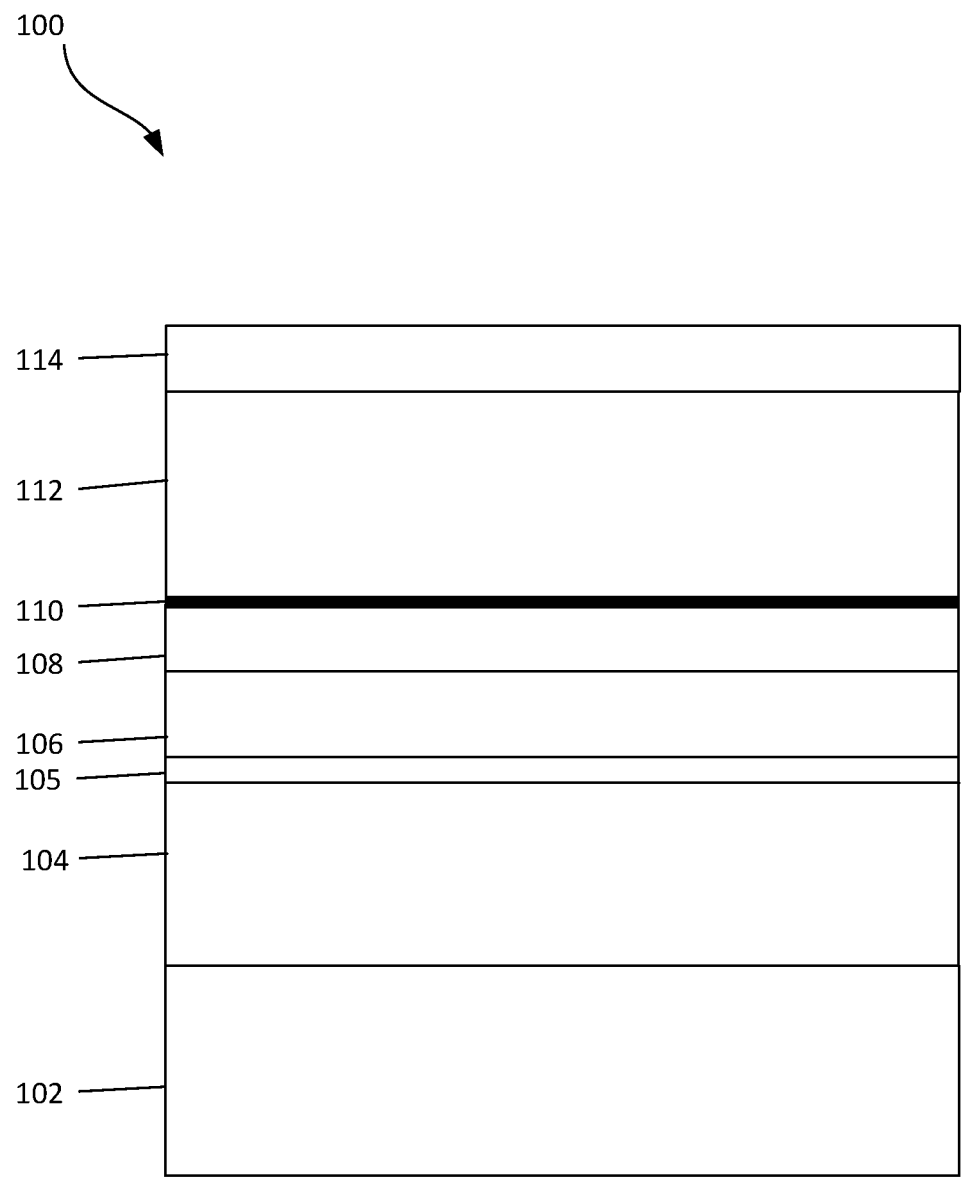
FIG. 1 is an example cross-section of a magnetic stack, according to various aspects of the present disclosure.

FIG. 1 is an example cross-section of a magnetic stack according to various aspects of the present disclosure. In the example of FIG. 1, a magnetic stack 100 is illustrated. In some examples, magnetic stack 100 may represent an example magnetic media used in a heat assisted magnetic recording (HAMR) hard disk drive (HDD). In the example of FIG. 1, magnetic stack 100 includes substrate 102, soft magnetic underlayer 104, seed layer 105, heatsink 106, interlayer 108, non-magnetic seed layer 110, magnetic recording structure 112, and overcoat layer 114.

In some examples, substrate 102 is disc-shaped and may include a non-magnetic metal, alloy or non-metal. For example, substrate 102 may comprise aluminum, an aluminum alloy, glass, ceramic, glass-ceramic, polymeric material, a laminate composite, or any other suitable non-magnetic material.

Soft magnetic underlayer (SUL) 104 is configured to function as a return path for magnetic flux produced by a magnetic write field during a write operation. In some examples, SUL 104 is disposed on a top surface of substrate 102. SUL 104 may include one or more layers of a soft magnetic material, such as CoFe, FeCoB, FeAlN, NiFe, or FeTaN, or combinations thereof. In one example, SUL 104 is approximately 10 nm to approximately 300 nm thick. SUL 104 may include multiple layers, which may be laminated structures and/or antiferromagnetically coupled layers.

Seed layer 105 is configured to promote growth of heat sink layer 106. Seed layer 105 is disposed on top of SUL 104. Seed layer 105 may include one or more layers of AlCr, CrRu, AlCrRu, ZnO, ZrN or combinations thereof. Typical seed layer thicknesses range from about 10 nm to about 30 nm. Seed layer 105 is deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

Heatsink layer 106 is configured to dissipate heat from one or more layers of magnetic stack 100. As illustrated in FIG. 1, heatsink layer 106 is disposed on top of seed layer 105. Heatsink layer 106 includes a metal or metal alloy that possesses both high thermal conductivity and hardness, such as Cu, Zr, Ag, Au, Mo, Pd, Ru, W, V, or combinations thereof. In some examples, the metal or metal alloy of heatsink layer 106 has a thermal conductivity ranging from 20 to at least about 100 W/m-K, depending on the thermal architecture. In one example, heatsink layer 106 is between about 20 nm to about 50 nm thick. In some examples, heatsink layer 106 includes a lattice structure, which may facilitate growth of desirable crystal structures of subsequently deposited magnetic layers.

In the example of FIG. 1, magnetic stack 100 includes an interlayer 108 which is disposed on a top surface of heatsink layer 106. Interlayer 108 may provide one or more functions for magnetic stack 100. Interlayer 108 separates the magnetic recording structure 112 from the layers beneath it to prevent the backflow of heat during recording. In some examples, interlayer 108 controls the growth orientation of magnetic recording structure 112. In another example, interlayer 108 may provide a diffusion barrier between various layers in magnetic stack 100. A single interlayer typically provides multiple functions. For example, a single interlayer may provide the functions of diffusion barrier and growth orientation template. Interlayer 108 may comprise a material of low thermal conductivity such as an oxide, a nitride or a boride (e.g., MgO, ZrN, TiN, $HfB_2$). Interlayer thickness may range from a few nanometers to more than 10 nm.

Non-magnetic seed layer 110 is configured to act as a nucleation layer which initiates the growth of the layers above, e.g., the growth of magnetic recording structure 112. Non-magnetic seed layer 110 may also be selected to optimize and set the properties of magnetic recording structure 112. Properties of magnetic recording structure 112 that can be optimized by non-magnetic seed layer 110 include grain size, roughness, orientation, ordering temperature, segregation, and magnetic moment. In some examples, non-magnetic seed layer 110 includes semiconductor materials such as GaN, AlN, AlGaN, AlN+GaN, or combinations thereof. In other examples, non-magnetic seed layer 110 may include at least one doping material, X, where X may include one or more of FePt, FePdPt, FePtC, Fe, Co, Pd, Pt, Au, Ag, Cu, Au, C etc. In some cases, dopant X has a concentration of no more than 65% by volume of non-magnetic seed layer 110. In some examples, dopant X may be a magnetic material in bulk. In the example where dopant X is a magnetic material, non-magnetic seed layer 110 remains non-magnetic due to the low concentration of dopant X in said non-magnetic seed layer 110. Non-magnetic seed layer 110 is disposed on a top surface of interlayer 108. In one example, non-magnetic seed layer 110 can have a thickness ranging from about 0.3 nm to less than 1 nm.

In the example of FIG. 1, magnetic recording structure 112 is configured to store data. Magnetic recording structure 112 is disposed on a top surface of non-magnetic seed layer 110. Magnetic recording structure 112 may include a single layer or multiple layers. Alternatively, magnetic recording structure 112 may be a patterned recording layer such as bit-patterned media.

Magnetic recording structure 112 may be a granular two-phase layer. In one such example, the first phase of magnetic recording structure 112 includes a plurality of magnetic grains and the second phase includes non-magnetic segregant disposed between the grain boundaries of the magnetic grains. The non-magnetic segregant may include one or more of C, $ZrO_x$, $TiO_x$, $SiO_x$, $Al_2O_3$, $Ta_2O_5$, $Si_3N_4$, BN, AlN, GaN, AlGaN, TiN, ZrN or another alternative oxide, nitride, boride or carbide material. Suitable materials for the magnetic grains include, for example, FePt, FeCoPt, FeXPt alloy, FeXPd alloy, CoPt, CoXPt where X is a dopant. In some examples, magnetic recording structure 112 may comprise a $L1_0$ phase FePt, CoPt or FeNiPt recording layer. The thickness of magnetic recording structure 112 may range from about 10 nm to about 15 nm, or beyond.

Overcoat layer 114 is configured to protect magnetic recording structure 112 from corrosion and mechanical damage during drive operation. As illustrated in FIG. 1, overcoat layer 114 is disposed on a top surface of magnetic recording structure 112. Overcoat layer 114 may be thermally and mechanically robust. For example, overcoat layer 114 may have a high melting point (e.g., a temperature which exceeds the Curie temperature of the magnetic recording layers), which may enable overcoat layer 114 to withstand HAMR writing conditions where temperatures may exceed at least 300° C. at the media surface during the narrow recording window. In some examples overcoat layer 114 is a carbon-based material. Examples of carbon-based materials include diamond-like carbon (DLC) or tetrahedral amorphous carbon (ta-C). Other examples of overcoat materials include silicon nitride ($Si_xN_y$) or silicon oxy-nitride and hydrogenated amorphous carbon (a-C:H). In the example of FIG. 1, overcoat layer is between about 2 nm and 3 nm in thickness. In some examples, overcoat layer may include a lubrication layer.

Figure 2:
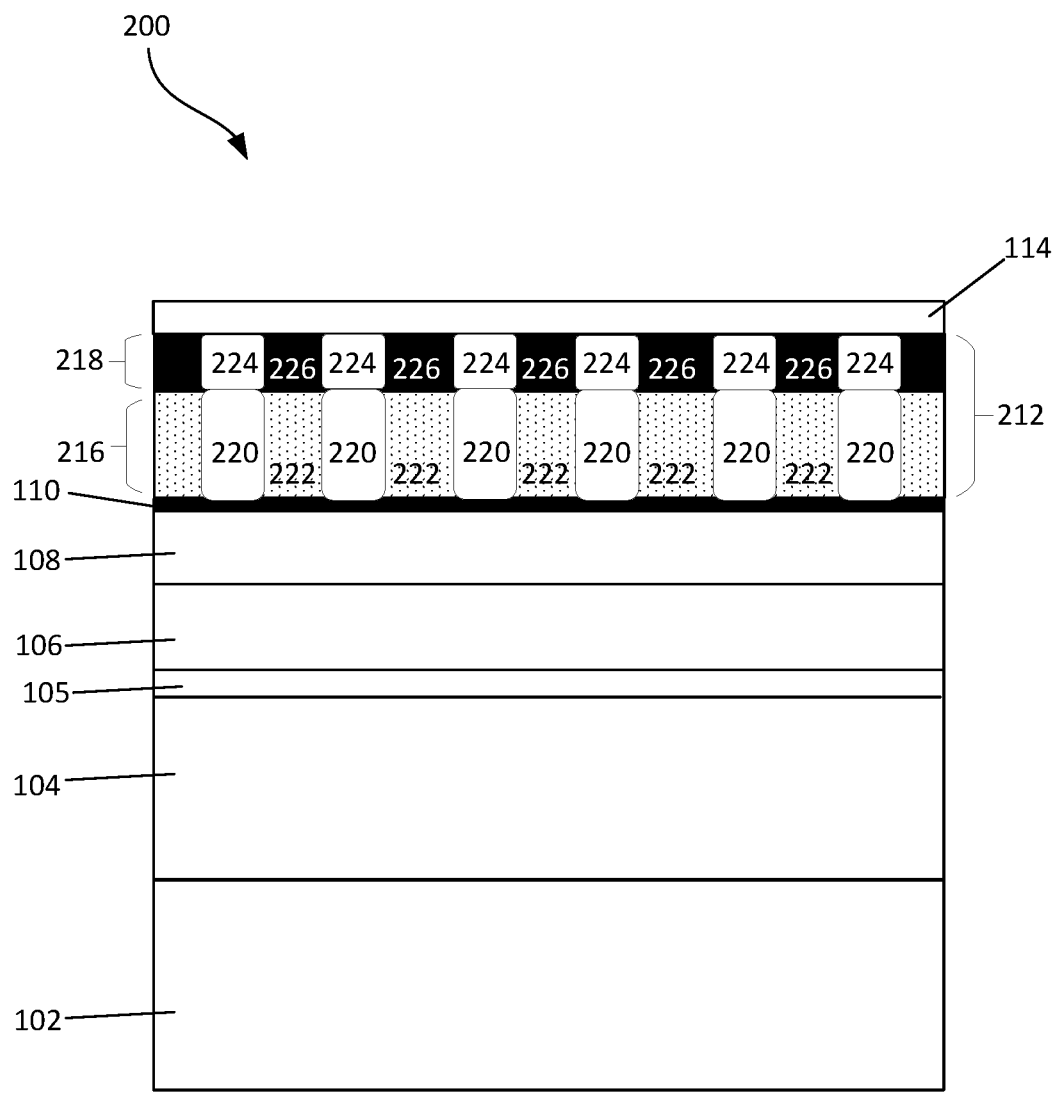
FIG. 2 is an example cross-section of a magnetic stack, according to various aspects of the present disclosure.

FIG. 2 is an example cross-section of a magnetic stack, according to various aspects of the present disclosure. Magnetic stack 200 of FIG. 2 is similar to magnetic stack 100 of FIG. 1, described above. FIG. 2 illustrates magnetic stack 200 and includes substrate 102, soft magnetic underlayer 104, seed layer 105, heatsink layer 106, interlayer 108, non-magnetic seed layer 110 and overcoat layer 114, as discussed above.

Magnetic stack 200 includes magnetic recording structure 212 that is configured to store data. Magnetic recording structure 212 is an example of a bilayer magnetic recording structure. In the example of FIG. 2, magnetic recording structure 212 is disposed on a top surface of non-magnetic seed layer 110. The non-magnetic seed layer 110 includes semiconductor materials such as GaN, AlN, AlGaN, AlN+GaN, or combinations thereof. In other examples, non-magnetic seed layer 110 may include at least one doping material, X, where X may include one or more of FePt, FePdPt, FePtC, Fe, Co, Pd, Pt, Au, Ag, Cu, Au, C etc. In some cases, dopant X has a concentration of no more than 50% by volume of non-magnetic seed layer 110. In some examples, dopant X may be a magnetic material in bulk. In the example where dopant X is a magnetic material, non-magnetic seed layer 110 remains non-magnetic due to the low concentration of dopant X in said non-magnetic seed layer 110, and the thin layer thickness. Non-magnetic seed layer 110 is disposed on a top surface of interlayer 108. In one example, non-magnetic seed layer 110 can have a thickness ranging from about 0.3 nm to less than 1 nm. Magnetic recording structure 212 may include a single layer or multiple layers.

In the example of FIG. 2, magnetic recording structure 212 is a bi-layer magnetic recording structure that includes a first magnetic recording layer 216 and a second magnetic recording layer 218. First magnetic recording layer 216 is disposed on a top surface of non-magnetic seed layer 110. Second magnetic recording layer 218 is disposed on a top surface of first magnetic recording layer 216.

First magnetic recording layer 216 includes a plurality of magnetic grains 220 separated by non-magnetic segregant material 222. Magnetic grains 220 have a columnar structure. In some examples, magnetic grains 220 are FePt, or FeCoPt and the amorphous segregant material 222 may include one or more of C, $ZrO_x$, $TiO_x$, $SiO_x$, $Al_2O_3$, $Ta_2O_5$, $Si_3N_4$, BN, AlN, GaN, AlGaN, TiN, ZrN or another alternative oxide, nitride, boride or carbide material or a combination thereof. In yet another example, magnetic grains 220 include, for example, FeXPt alloy, FeXPd alloy, CoPt, CoXPt where X is a dopant. Other suitable materials for non-magnetic segregant material 222 may include one or more of C, $ZrO_x$, $TiO_x$, $SiO_x$, $Al_2O_3$, $Si_3N_4$, or another alternative oxide, nitride, boride or carbide material. In some examples, magnetic recording structure 212 may comprise a $L1_0$ phase FePt, CoPt or FeNiPt recording layer.

Second magnetic recording layer 218 includes a plurality of magnetic grains 224 surrounded by or separated by non-magnetic segregant material 226. Magnetic grains 224 have a columnar structure influenced by magnetic grains 224 and non-magnetic segregant material 226 being in amorphous, form. In some examples, magnetic grains 224 are FePt or FeCoPt and the amorphous segregant material 226 may include one or more of C, $ZrO_x$, $TiO_x$, $SiO_x$, $Al_2O_3$, $Ta_2O_5$, $Si_3N_4$, BN, AlN, GaN, AlGaN, TiN, ZrN or another alternative oxide, nitride, boride or carbide material or a combination thereof. In yet another example, non-magnetic segregant material 224 may include one or more of C, $ZrO_x$, $TiO_x$, $SiO_x$, $Al_2O_3$, $Si_3N_4$, or another alternative oxide, nitride, boride or carbide material. Other suitable materials for magnetic grains 226 include, for example, Fe, Pt, Co, FeXPt alloy, FeXPd alloy, CoPt, CoXPt where X is a dopant or combinations thereof.

In one example, magnetic recording layer 216 is formed from the same materials as magnetic recording layer 218. In another example, magnetic recording layer 216 and magnetic recording layer 218 are formed from different materials.

The thickness of magnetic recording structure 212 may be from about 10 nm to about 15 nm and above.

Figure 3:
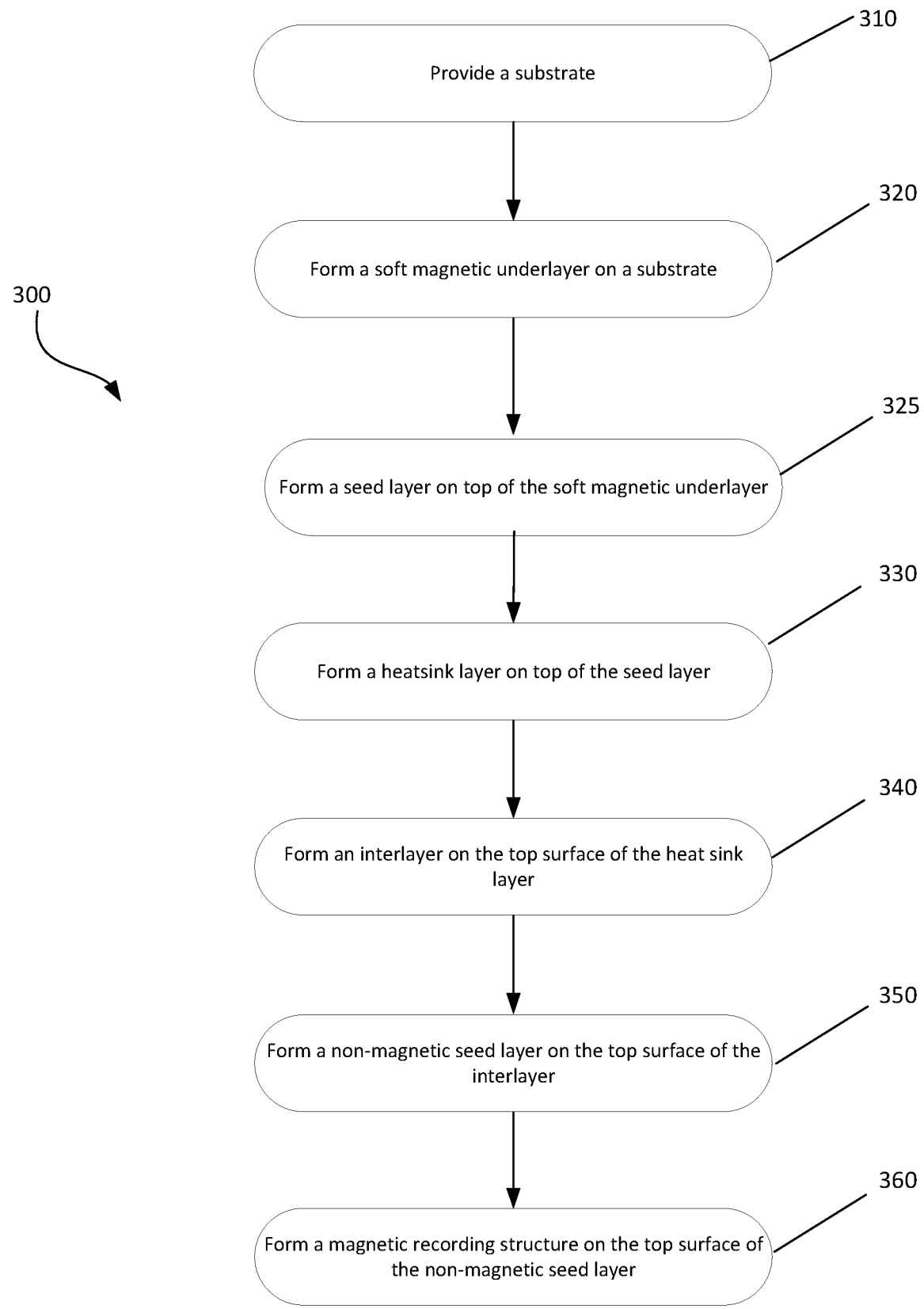
FIG. 3 is a flow chart illustrating an example method of manufacturing a magnetic stack, according to various aspects of the present disclosure.

FIG. 3 is a flow chart illustrating an example method of manufacturing a magnetic stack, according to various aspects of the present disclosure. The flowchart of FIG. 3 is described with reference to magnetic stack 200 of FIG. 2. A substrate 102 is provided at step 310. The substrate 102 may be formed of glass, aluminum, AlTiC or other suitable material. The substrate 102 may be subjected to processing such as cutting, polishing or chemical treatment.

A soft magnetic underlayer (SUL) 104 is formed on top of the substrate at step 320. The soft magnetic underlayer may include one or more layers of a soft magnetic material. For example, SUL 104 may be a 10 to 300 nm thick layer including a soft magnetic material such as CoFe, FeCoB, FeAlN, NiFe, or FeTaN, or combinations thereof with various additives to tune their properties. SUL 104 may include multiple SUL layers. The multiple SUL layers may be either ferromagnetically coupled or antiferromagnetically coupled. In some examples, the multiple SUL layers may be separated by one or more layers. SUL 104 is deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

Seed layer 105 is formed on a top surface of the SUL at step 325. Seed layer 105 may include one or more layers of AlCr, CrRu, AlCrRu, ZnO, ZrN or combinations thereof. Typical seed layer thicknesses range from about 1 nm to about 30 nm. Seed layer 105 is deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

Heatsink layer 106 is formed on top of the seed layer at step 330. Heatsink layer 106 can include a variety of materials e.g., one or more of Cu, Zr, Ag, Au, Mo, Pd, Ru, W, V, or combinations thereof. The thickness of the heatsink layer 106 is controlled in order to provide desired heat transfer performance. Typical heatsink layer 106 thicknesses range from between about 20 nm to about 50 nm. Heatsink layer 106 is deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

After formation of heatsink layer 106, interlayer 108 is formed on a top surface of heatsink layer at step 340. Interlayer 108 may comprise a material of low thermal conductivity such as an oxide, a nitride, or a boride (e.g., MgO, ZrN, TiN, $HfB_2$). Typical interlayer thicknesses range from between about a few nanometers to more than 10 nm. In the deposition of interlayer 108, various deposition techniques may be used. Examples of illustrative deposition methods include radio frequency (RF) sputtering, direct current (DC) sputtering, reactive magnetron sputtering, chemical vapor deposition (CVD), pulsed laser deposition, molecular beam epitaxy, and atomic layer deposition (ALD).

In step 350, non-magnetic seed layer 110 is formed on a top surface of interlayer 108. Typical non-magnetic seed layer 110 thickness ranges from about 0.3 nm to less than 1 nm. In some examples, non-magnetic seed layer 110 includes semiconductor materials such as GaN, AlN, AlGaN, AlN+GaN, or combinations thereof. In other examples, non-magnetic seed layer 110 may include at least one doping material, X, where X may include one or more of FePt, FePdPt, FePtC, Fe, Co, Pd, Pt, Au, Ag, Cu, Au, C etc. In some cases, dopant X has a concentration of no more than 30% by volume of non-magnetic seed layer 110. In other examples, dopant X may be as high as 65% by volume. Non-magnetic seed layer 110 is deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

Step 360 represents formation of magnetic recording structure 212 on a top surface of the non-magnetic seed layer 110. Magnetic recording structure 212 may include a single layer or multiple layers. Magnetic recording structure 212 may be a granular two-phase layer. In one such example, the first phase of magnetic recording structure 212 includes a plurality of magnetic grains and the second phase includes non-magnetic segregant disposed between the grain boundaries of the magnetic grains. The non-magnetic segregant may include one or more of C, $ZrO_x$, $TiO_x$, $SiO_x$, $Al_2O_3$, $Si_3N_4$, BN, AlN, GaN, AlGaN, or another alternative oxide, nitride, boride or carbide material. Suitable materials for the magnetic grains include, for example, FePt, FeCoPt, FeXPt alloy, FeXPd alloy, CoPt, CoXPt where X is a dopant. The thickness of magnetic recording structure 212 may range from about 10 nm to about 15 nm and beyond. In some examples, the magnetic recording layer can be formed by DC- or RF-sputtering of a composite target of magnetic material (e.g., FePt, FeCoPt etc.) and non-magnetic segregant (e.g., C, BN, $Si_3N_4$, $SiO_2$, AlN, GaN, AlGaN, etc.). In other examples, magnetic recording structure 212 can be fabricated via co-deposition of magnetic material and non-magnetic segregant using magnetron sputtering.

Figure 4:
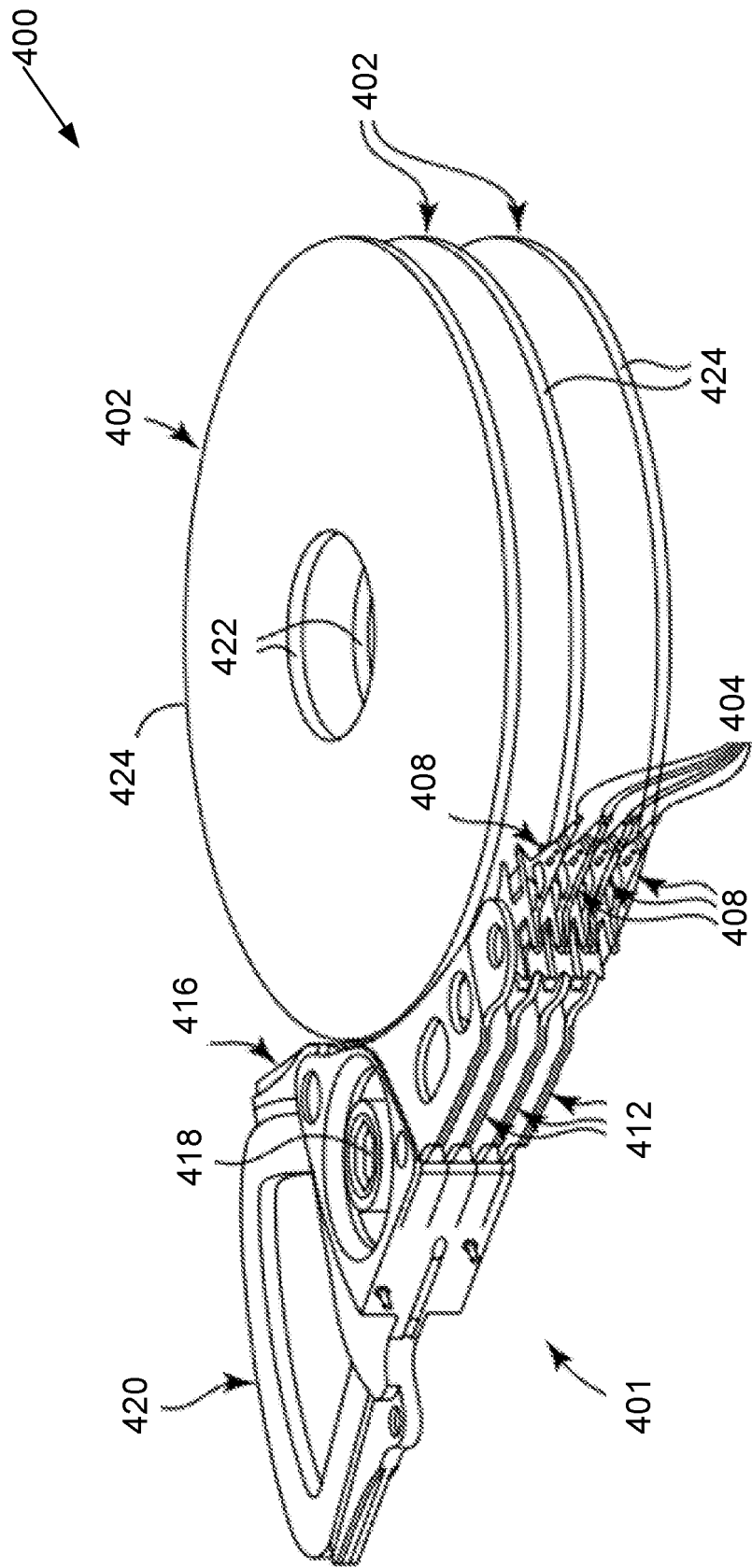
FIG. 4 is a perspective view of a hard disk drive, according to various aspects of the present disclosure.

FIG. 4 is a perspective view of a hard disk drive, according to various aspects of the present disclosure. Hard disk drive 400 includes a head stack assembly 401 and magnetic media 402. In one example, magnetic media 402 includes magnetic disks that each store information or data in a plurality of circular, concentric data tracks.

Head stack assembly 401 includes a voice coil drive actuator 420, an actuator mechanism 416, shaft 418, a plurality of rotatable drive actuator arms 412, and a plurality of head gimbal assemblies 408. Voice coil drive actuator 420 is controlled by servo control circuitry. Voice coil drive actuator 420 is configured to rotate actuator mechanism 416 about shaft 418 in either rotational direction. Rotatable drive actuator arms 412 are each coupled to a respective HGA of HGAs 408, such that rotating actuator mechanism 416 causes rotatable drive actuator arms 112 and HGAs 408 to move relative to magnetic media 402. Each HGA 408 includes a respective slider 404. Positioning HGAs 408, and thus sliders 404, over the surfaces of magnetic media 402, between inner diameters 422 and outer diameters 424 of magnetic media 402 enables sliders 404 to read data from and write data to magnetic media 402. Media 402 may include the magnetic stack structures illustrated in FIG. 1 or FIG. 2. In some examples, sliders 404 are themselves aerodynamically designed to fly on an air bearing that is created adjacent to each disk surface during disk rotation.

Various examples have been presented for the purpose of illustration and description. These and other examples are within the scope of the following claims.

What is claimed is:

1. A magnetic stack comprising:
   a substrate;
   a soft magnetic underlayer disposed on a top surface of the substrate;
   a heat sink layer disposed on top of the soft magnetic underlayer;
   an interlayer disposed on a top surface of the heat sink layer;
   a non-magnetic seed layer disposed on a top surface of the interlayer, wherein the non-magnetic seed layer comprises AlN, GaN, AlGaN or combinations thereof, and wherein the non-magnetic seed layer is doped with Fe, Pt, Co, Au, Ag, Cu, Pd, FePt or combinations thereof; and
   a magnetic recording structure disposed on a top surface of the non-magnetic seed layer wherein the magnetic recording structure comprises a plurality of magnetic recording layers.

2. The magnetic stack of claim 1, wherein the dopant comprises no more than 65% by volume of the non-magnetic seed layer.

3. The magnetic stack of claim 1, wherein a thickness of the non-magnetic seed layer is less than 1 nm.

4. The magnetic stack of claim 1, wherein the plurality of magnetic recording layers comprise a plurality of magnetic grains surrounded by a segregant.

5. The magnetic stack of claim 4, wherein the segregant comprises GaN.

6. The magnetic stack of claim 4 wherein the segregant comprises AlGaN.

7. A magnetic stack comprising:
   a substrate,
   a soft magnetic underlayer disposed on a top surface of the substrate,
   a heat sink layer disposed on a top surface of the soft magnetic underlayer, an interlayer disposed on a top surface of the heat sink layer; and
   a magnetic recording structure disposed on top of a non-magnetic seed layer, wherein the magnetic recording structure comprises a plurality of magnetic recording layers; and
   wherein the plurality of magnetic recording layers comprise a plurality of magnetic grains surrounded by a segregant, wherein the segregant comprises GaN or AlGaN.

8. The magnetic stack of claim 7, wherein the non-magnetic seed layer comprises AlN, GaN, AlGaN or combinations thereof.

9. The magnetic stack of claim 8, wherein the non-magnetic seed layer is doped with Fe, Pt, Co, Au, Au, Cu, Pd, FePt or combinations thereof.

10. The magnetic stack of claim 9, wherein the dopant comprises no more than 65% by volume of the non-magnetic seed layer.

11. The magnetic stack of claim 7, wherein a thickness of the non-magnetic seed layer is less than 1 nm.

12. A method comprising the steps of:
    providing a substrate,
    forming a soft magnetic underlayer on a top surface of the substrate,
    forming a heat sink layer on a top surface of the soft magnetic underlayer,
    forming an interlayer on a top surface of the heat sink layer,
    forming a non-magnetic seed layer on a top surface of the interlayer,
    forming a magnetic recording structure on a top surface of the non-magnetic seed layer, wherein the magnetic recording structure contains a plurality of magnetic recording layers, and wherein the magnetic recording layers comprise a plurality of magnetic grains surrounded by a segregant comprising GaN or AlGaN.

13. The method of claim 12, wherein the non-magnetic seed layer comprises AlN, GaN, AlGaN or combinations thereof.

14. The method of claim 12, wherein the non-magnetic seed layer is doped with Fe, Pt, Co, Au, Au, Cu, Pd, FePt or combinations thereof.

15. The method of claim 14, wherein the dopant comprises no more than 65% by volume of the non-magnetic seed layer.

16. The method of claim 12, wherein a thickness of the non-magnetic seed layer is less than 1 nm.

* * * * *